(12) United States Patent
Mauro

(10) Patent No.: US 9,512,030 B2
(45) Date of Patent: Dec. 6, 2016

(54) HIGH CTE POTASSIUM BOROSILICATE CORE GLASSES AND GLASS ARTICLES COMPRISING THE SAME

(71) Applicant: CORNING INCORPORATED, Corning, NY (US)

(72) Inventor: John Christopher Mauro, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/380,433

(22) PCT Filed: Feb. 28, 2013

(86) PCT No.: PCT/US2013/028145
§ 371 (c)(1),
(2) Date: Aug. 22, 2014

(87) PCT Pub. No.: WO2013/130700
PCT Pub. Date: Sep. 6, 2013

(65) Prior Publication Data
US 2015/0037552 A1  Feb. 5, 2015

Related U.S. Application Data

(60) Provisional application No. 61/604,869, filed on Feb. 29, 2012.

(51) Int. Cl.
*C03C 3/091* (2006.01)
*C03C 3/089* (2006.01)
*B32B 17/00* (2006.01)
*C03B 17/02* (2006.01)

(52) U.S. Cl.
CPC .............. *C03C 3/091* (2013.01); *B32B 17/00* (2013.01); *C03C 3/089* (2013.01); *B32B 2250/03* (2013.01); *B32B 2250/40* (2013.01); *B32B 2307/30* (2013.01); *C03B 17/02* (2013.01); *Y02P 40/57* (2015.11); *Y10T 428/24942* (2015.01)

(58) Field of Classification Search
CPC ....... C03C 3/089; C03C 3/091; C03C 17/02; Y10T 428/24942; B32B 17/00; B32B 2250/03; B32B 2307/30; B32B 2250/40
See application file for complete search history.

(56) References Cited

U.S. PATENT DOCUMENTS

| | | |
|---|---|---|
| 3,275,492 A | 9/1966 | Herbert |
| 3,499,776 A | 3/1970 | Baak et al. |
| 3,597,305 A | 8/1971 | Giffen |
| 3,673,049 A | 6/1972 | Giffen et al. |
| 3,737,294 A | 6/1973 | Dumbaugh, Jr. et al. |
| 3,746,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,214,886 A | 7/1980 | Shay et al. |
| 4,980,318 A | 12/1990 | Araujo |
| 5,342,426 A | 8/1994 | Dumbaugh, Jr. |
| 5,411,601 A | 5/1995 | Higuchi et al. |
| 5,559,060 A | 9/1996 | Dumbaugh, Jr. et al. |
| 5,631,195 A | 5/1997 | Yanagisawa et al. |
| 5,780,373 A | 7/1998 | Yanagisawa et al. |
| 5,895,719 A | 4/1999 | Fyles et al. |
| 5,908,794 A | 6/1999 | Maeda et al. |
| 5,925,583 A | 7/1999 | Yoshii et al. |
| 6,087,284 A | 7/2000 | Brix et al. |
| 6,162,749 A | 12/2000 | Brocheton et al. |
| 6,188,013 B1 | 2/2001 | Inaba et al. |
| 6,207,603 B1 | 3/2001 | Danielson et al. |
| 6,319,867 B1 | 11/2001 | Chacon et al. |
| 6,680,266 B1 | 1/2004 | Peuchert et al. |
| RE38,959 E | 1/2006 | Kohli |
| 6,992,030 B2 | 1/2006 | Paulson |
| 7,087,541 B2 | 8/2006 | Kohli |
| 7,144,835 B2 | 12/2006 | Kass et al. |
| 7,201,965 B2 | 4/2007 | Gulati et al. |
| 7,315,125 B2 | 1/2008 | Kass |
| 7,341,966 B2 | 3/2008 | Marques |
| 7,514,149 B2 | 4/2009 | Bocko et al. |
| 7,781,354 B2 | 8/2010 | Kurachi et al. |
| 8,007,913 B2 | 8/2011 | Coppola et al. |
| 2003/0050176 A1* | 3/2003 | Kawase ................. C03C 3/078 501/72 |

(Continued)

FOREIGN PATENT DOCUMENTS

| | | |
|---|---|---|
| CN | 101074146 A | 11/2007 |
| EP | 146188 A1 | 6/1985 |

(Continued)

OTHER PUBLICATIONS

International Search Report and Written Opinion, dated Jun. 13, 2013, pp. 1-9, International Patent Application No. PCT/US2013/028145, European Patent Office, The Netherlands.

(Continued)

*Primary Examiner* — Elizabeth A Bolden
(74) *Attorney, Agent, or Firm* — Michael A. Hood

(57) ABSTRACT

High CTE glass compositions and laminated glass articles formed from the same are described. In one embodiment, a glass composition may include from about 70 mol. % to about 80 mol. % $SiO_2$, from about 0 mol. % to about 8 mol. % $Al_2O_3$, and from about 3 mol. % to about 10 mol. % $B_2O_3$ as glass formers. The glass composition may further include alkali oxides such as from about 0 mol. % to about 2 mol. % $Na_2O$ and from about 10 mol. % to about 15 mol. % $K_2O$. In addition, the glass composition may include from about 5 mol. % to about 6 mol. % of alkaline earth oxide. The alkaline earth oxide may include at least one of CaO, SrO, and BaO. However, the glass composition may be substantially free from MgO. The glass composition may be used in a laminated glass article, such as a laminated glass article formed by a fusion laminate process.

25 Claims, 1 Drawing Sheet

(56) References Cited

U.S. PATENT DOCUMENTS

| | | | |
|---|---|---|---|
| 2003/0087746 | A1 | 5/2003 | Ritter et al. |
| 2003/0092556 | A1 | 5/2003 | Kohli |
| 2005/0054514 | A1* | 3/2005 | Ishioka .................. C03C 3/089 501/65 |
| 2007/0037686 | A1 | 2/2007 | Goulas |
| 2007/0193623 | A1 | 8/2007 | Krasnov |
| 2007/0259767 | A1 | 11/2007 | Siebers et al. |
| 2007/0270300 | A1 | 11/2007 | Kurachi et al. |
| 2008/0308146 | A1 | 12/2008 | Krasnov et al. |
| 2009/0011917 | A1 | 1/2009 | Goedeke et al. |
| 2009/0023008 | A1 | 1/2009 | Saiki |
| 2009/0103040 | A1* | 4/2009 | Shimizu .................. C03C 3/078 349/158 |
| 2009/0239008 | A1 | 9/2009 | Ovutthitham |
| 2009/0286091 | A1 | 11/2009 | Danielson et al. |
| 2010/0084016 | A1 | 4/2010 | Aitken et al. |
| 2010/0300536 | A1 | 12/2010 | Aitken |
| 2011/0094584 | A1 | 4/2011 | Sawada et al. |
| 2015/0037553 | A1 | 2/2015 | Mauro |
| 2015/0051061 | A1* | 2/2015 | Kiczenski ............... B32B 17/00 501/37 |

FOREIGN PATENT DOCUMENTS

| | | |
|---|---|---|
| EP | 0396896 B1 | 5/1994 |
| FR | 2759077 A1 | 8/1988 |
| JP | 56145132 A | 11/1981 |
| JP | 08-133778 | 5/1996 |
| JP | 09-301733 | 11/1997 |
| JP | 10-152338 | 6/1998 |
| JP | 10-152339 | 6/1998 |
| JP | 11-135819 | 5/1999 |
| JP | 11-180727 | 7/1999 |
| JP | 11-180728 | 7/1999 |
| JP | 11-310430 | 11/1999 |
| JP | 11-310432 | 11/1999 |
| JP | 11-310433 | 11/1999 |
| JP | 11-335133 | 12/1999 |
| JP | 2000-91601 A | 3/2000 |
| JP | 2001-294441 | 10/2001 |
| JP | 2002-025762 | 1/2002 |
| JP | 2002-053340 | 2/2002 |
| JP | 2003073142 A | 3/2003 |
| JP | 2003-261352 | 9/2003 |
| JP | 2004-244257 | 9/2004 |
| JP | 2004035295 | 2/2005 |
| JP | 2005-089286 | 4/2005 |
| JP | 2007246365 | 3/2006 |
| JP | 2006188406 A | 7/2006 |
| JP | 2004238283 | 4/2008 |
| JP | 2008280189 A | 11/2008 |
| JP | 2002-198504 | 7/2012 |
| WO | 2006137683 A1 | 12/2006 |
| WO | 2007052489 A1 | 5/2007 |

OTHER PUBLICATIONS

Chinese Office Action, dated Mar. 28, 2016, pp. , Chinese Application No. 201380021236.7, The State Intellectual Property Office of the People's Republic of China.

* cited by examiner

HIGH CTE POTASSIUM BOROSILICATE CORE GLASSES AND GLASS ARTICLES COMPRISING THE SAME

CROSS-REFERENCE TO RELATED APPLICATIONS

This application is a national stage entry under 35 U.S.C. §371 of International Application No. PCT/US2013/028145 filed on Feb. 28, 2013, which claims the benefit of priority under 35 U.S.C. §119 of U.S. Provisional Application No. 61/604,869, filed on Feb. 29, 2012, the content of which is relied upon and incorporated herein by reference in its entirety.

BACKGROUND

1. Field

The present specification generally relates to glass compositions and, more specifically, to high CTE potassium borosilicate glass compositions and glass articles comprising the same.

2. Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Glass articles are commonly strengthened by thermal tempering and/or by ion exchange treatment. In either case, the glass article is subjected to additional processing steps after the glass article is formed. These additional processing steps may increase the overall cost of the glass article. Moreover, the additional handling required to carry out these processing steps increases the risk of damage to the glass article which decreases manufacturing yields and further increases production costs and the ultimate cost of the glass article.

Accordingly, a need exists for alternative glass compositions which may be used to produce strengthened glass articles without the need for additional processing steps and glass articles manufactured from such compositions.

SUMMARY

According to one embodiment, a glass composition may include from about 70 mol. % to about 80 mol. % $SiO_2$; from about 0 mol. % to about 8 mol. % $Al_2O_3$; and from about 3 mol. % to about 10 mol. % $B_2O_3$ as glass network formers. The glass composition may further include alkali oxides such as from about 0 mol. % to about 2 mol. % $Na_2O$ and from about 10 mol. % to about 15 mol. % $K_2O$. In addition, the glass composition may include from about 5 mol. % to about 6 mol. % alkaline earth oxide. The alkaline earth oxide may include at least one of CaO, SrO, and BaO. However, the glass composition may be substantially free from MgO. The glass composition comprises a coefficient of thermal expansion which is greater than or equal to $75 \times 10^{-7}/°C$. averaged over a temperature range from 20° C. to 300° C. and a liquidus viscosity greater than or equal to 250 kPoise. The glass composition is particularly well suited for use as a core glass layer in a laminated glass article, such as a laminated glass article formed by a fusion laminate process.

In one set of embodiments, a glass article includes a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process. The glass core layer is formed from a glass composition which includes from about 70 mol. % to about 80 mol. % $SiO_2$; from about 0 mol. % to about 8 mol. % $Al_2O_3$; and from about 3 mol. % to about 10 mol. % $B_2O_3$ as glass network formers. The glass composition may further include alkali oxides such as from about 0 mol. % to about 2 mol. % $Na_2O$ and from about 10 mol. % to about 15 mol. % $K_2O$. The glass composition comprises a coefficient of thermal expansion which is greater than or equal to $75 \times 10^{-7}/°C$. averaged over a temperature range from 20° C. to 300° C.

Additional features and advantages of the glass compositions and glass articles formed from the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
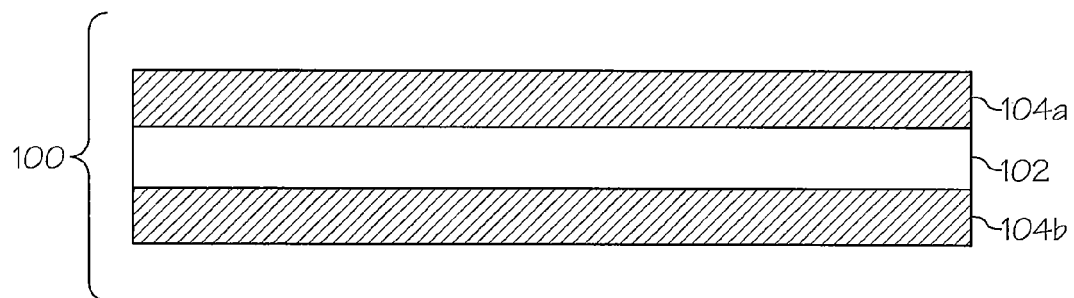
FIG. 1 schematically depicts a cross section of a laminated glass article according to one or more embodiments shown and described herein.

Reference will now be made in detail to embodiment of glass compositions having high coefficients of thermal expansion and glass articles incorporating the same, examples of which are illustrated in the accompanying drawings. Whenever possible, the same reference numerals will be used throughout the drawings to refer to the same or like parts. The glass compositions described herein generally have relatively high coefficients of thermal expansion and, as such, may be utilized in conjunction with cladding glass compositions having relatively low coefficients of thermal expansion to produce laminated glass articles which are compressively stressed without being ion-exchanged or thermally tempered. In one embodiment, a glass composition may include from about 70 mol. % to about 80 mol. % $SiO_2$; from about 0 mol. % to about 8 mol. % $Al_2O_3$; and from about 3 mol. % to about 10 mol. % $B_2O_3$ as glass network formers. The glass composition may further include alkali oxides such as from about 0 mol. % to about 2 mol. % $Na_2O$ and from about 10 mol. % to about 15 mol. % $K_2O$. In addition, the glass composition may include from about 5 mol. % to about 6 mol. % of alkaline earth oxide. The alkaline earth oxide may include at least one of CaO, SrO, and BaO. However, the glass composition may be substantially free from MgO. The glass compositions and glass articles formed from the glass compositions will be described in more detail herein with specific reference to the appended drawings.

The term "liquidus viscosity, as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

The term "substantially free," when used to describe the absence of a particular oxide constituent in a glass composition, means that the constituent is present in the glass composition as a contaminant in a trace amount of less than 1 mol. %.

In the embodiments of the glass compositions described herein, the concentration of constituent components (e.g., $SiO_2$, $Al_2O_3$, $B_2O_3$ and the like) are given in mole percent (mol. %) on an oxide basis, unless otherwise specified.

The glass compositions described herein have properties, such as the liquidus viscosity and the liquidus temperature, which make the glass compositions particularly well suited to use with fusion forming processes, such as the fusion down draw process and/or the fusion lamination process. These properties are attributable to the specific compositions of the glasses, as will be described in more detail herein.

In the embodiments of the glass compositions described herein $SiO_2$ is the largest constituent of the composition and, as such, $SiO_2$ is the primary constituent of the resulting glass network. $SiO_2$ is utilized in the glass compositions described herein to obtain the desired liquidus viscosity while, at the same time, offsetting the amount of $Al_2O_3$ added to the composition, as will be described in further detail herein. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount greater than or equal to about 70 mol. %. For example, in some embodiments, the amount of $SiO_2$ in the glass composition is greater than or equal to about 70 mol. % and less than or equal to about 80 mol. %. In some other embodiments $SiO_2$ is present in the glass composition in an amount greater than or equal to about 73 mol. % and less than or equal to about 77 mol. %.

In some embodiments, the glass compositions may further comprise $Al_2O_3$. $Al_2O_3$, when present, also serves as a glass network former, similar to $SiO_2$. Like $SiO_2$, $Al_2O_3$ increases the viscosity of the glass composition due to its tetrahedral coordination in a glass melt formed from the glass composition. However, when the concentration of $Al_2O_3$ is balanced against the concentration of $SiO_2$ and the concentrations of alkali and/or alkaline earth oxides in the glass composition, the $Al_2O_3$ can reduce the liquidus temperature of the glass melt, thereby enhancing the liquidus viscosity and improving the compatibility of the glass composition with certain forming processes such as, for example, the fusion draw process. However, the presence of $Al_2O_3$ in the glass compositions also increases the mobility of alkali constituents in the glass components because the alkali constituents used by aluminum for charge compensation are more loosely bound to the glass network relative to alkali constituents used for charge compensating boron, or other alkali constituents, which contribute to the formation of non-bridging oxygen in the glass network. Accordingly, the amount of $Al_2O_3$ in the glass compositions should be minimized.

In the embodiments of the glass compositions described herein, the concentration of $Al_2O_3$ in the glass compositions, when present, is generally less than or equal to about 10 mol. % in order to achieve a glass composition having the desired liquidus temperature. For example, in some embodiments, the concentration of $Al_2O_3$ in the glass compositions is greater than or equal to about 0 mol. % and less than or equal to about 8 mol. %. In some embodiments, the concentration of $Al_2O_3$ in the glass compositions is less than or equal to about 6 mol. %. For example, in some embodiments, the concentration of $Al_2O_3$ in the glass compositions is greater than or equal to about 0 mol. % and less than or equal to about 5 mol. % or even greater than or equal to about 0 mol. % and less than or equal to about 4 mol. %. In some other embodiments, the concentration of $Al_2O_3$ is the glass compositions is greater than or equal to about 0 mol. % and less than or equal to about 3 mol. %.

The glass compositions in the embodiments described herein further comprise $B_2O_3$. Like $SiO_2$ and $Al_2O_3$, $B_2O_3$ contributes to the formation of the glass network. Conventionally, $B_2O_3$ is added to a glass composition in order to decrease the viscosity of the glass composition. However, in the embodiments described herein, $B_2O_3$ works in conjunction with additions of $K_2O$ and $Al_2O_3$ (when present) to increase the annealing point of the glass composition, increase the liquidus viscosity, and inhibit alkali mobility. The interactions with $K_2O$ and, optionally, $Al_2O_3$, will be described in further detail herein.

In the embodiments described herein, $B_2O_3$ is generally present in the glass compositions in an amount greater than or equal to about 3 mol. %. For example, in some embodiments, $B_2O_3$ is present in the glass compositions in a concentration greater than or equal to about 3 mol. % and less than or equal to about 10 mol. %. In other embodiments described herein, $B_2O_3$ is present in the glass compositions in a concentration of less than about 8 mol. %. For example, in some embodiments, the concentration of $B_2O_3$ in the glass composition is greater than or equal to about 3 mol. % and less than or equal to about 8 mol. %, or even less than or equal to about 7 mol. %. In some other embodiments, the concentration of $B_2O_3$ in the glass compositions is greater than or equal to about 4 mol. % and less than or equal to about 5 mol. %.

The glass compositions in the embodiments described herein also include alkali oxides. Specifically, the glass compositions described herein include at least $K_2O$. The addition of alkali oxides such as $K_2O$ to the glass compositions increases the average coefficient of thermal expansion of the resultant glass and also decreases the liquidus temperature of the glass. $K_2O$ is used as the primary alkali oxide constituent as the relatively large ionic radius of $K_2O$ (relative to other alkali oxides such as $Na_2O$ and $Li_2O$) decreases the diffusivity of $K_2O$ in the glass. Low $K_2O$ diffusivity is particularly important when the glass composition is used to form backplanes for displays and the diffusion of $K_2O$ from the glass to thin film transistors deposited on the glass damages the transistors. In embodiments where the glass composition is utilized to form a glass core layer of a laminated glass article, the presence of $K_2O$ in the composition may facilitate ion-exchange strengthening of the cladding layers at the interface between the glass core layer and the glass cladding layers fused to the glass core layer.

In the embodiments described herein, the concentration of $K_2O$ in the glass compositions is generally less than about 15 mol. %. For example, in some embodiments, the concentration of $K_2O$ in the glass compositions is greater than or equal to about 10 mol. % and less than or equal to about 15 mol. %. In some other embodiments, the concentration of $K_2O$ is greater than or equal to about 11.5 mol. % and less than or equal to about 12.5 mol. %.

As noted hereinabove, $K_2O$ in the glass compositions works in conjunction with $B_2O_3$ to increase the viscosity of the glass and to inhibit alkali diffusivity. In particular, in the embodiments of the glass compositions described herein, the concentration of $K_2O$ is greater than the sum of the concentration of $B_2O_3$ and the concentration of $Al_2O_3$ (i.e., $K_2O$ (mol. %)>$B_2O_3$ (mol. %)+$Al_2O_3$ (mol. %)). This excess of alkali oxide alters several characteristics of the resulting glass. Specifically, $Al_2O_3$ utilizes alkali metals, such as the potassium from $K_2O$, for charge stabilization. Once the aluminum is charge-stabilized, excess potassium in the glass composition interacts with boron in the glass composition and converts the boron from its standard trigonal (threefold-coordinated) configuration into a tetrahedral (fourfold-coordinated) configuration. The change in the coordination of the boron from trigonal to tetrahedral increases the annealing point and liquidus viscosity of the glass while inhibiting alkali diffusivity as the excess alkali (i.e., potassium) is bound to the boron.

In some embodiments of the glass compositions described herein, the glass compositions may comprise an additional alkali oxide such as, for example $Na_2O$. In embodiments where $Na_2O$ is present in the glass composition, the $Na_2O$ may be introduced in the composition when sodium-containing glass cullet, such as recycled glass cullet, is utilized to produce the glass composition. In the embodiments described herein, the concentration of $Na_2O$ may be greater than or equal to about 0 mol. % and less than or equal to about 2 mol. %. In some other embodiments, the concentration of $Na_2O$ in the glass composition may be greater than or equal to about 0 mol. % and less than or equal to about 1 mol. %. In some embodiments where $Na_2O$ is present in the glass compositions, the $Na_2O$ may be present in a concentration greater than or equal to about 0.1 mol. %. For example, in some embodiments the concentration of $Na_2O$ in the glass compositions may be greater than or equal to about 0.1 mol. % and less than or equal to about 2 mol. %. In some other embodiments, the concentration of $Na_2O$ in the glass compositions may be greater than or equal to about 0.1 mol. % and less than or equal to about 1 mol. %.

The glass compositions described herein may further comprise one or more alkaline earth oxide. The alkaline earth oxides improve the melting behavior of the glass composition, lower the melting temperature of the glass composition, and inhibit the diffusion of alkali constituents in the glass composition. In the embodiments of the glass compositions described herein the alkaline earth oxide includes at least one of CaO, SrO, BaO or combinations thereof. In some embodiments, the primary alkaline earth oxide present in the glass composition is BaO which is utilized to minimize alkali diffusivity. However, in other embodiments, the alkaline earth oxide primarily comprises SrO and/or CaO to lower the density of the glass composition. In still other embodiments, the glass compositions are substantially free from BaO, such as when the glass composition is a "SuperGreen" or environmentally friendly glass composition.

In the embodiments described herein, the glass compositions generally comprise less than about 6 mol. % alkaline earth oxide. For example, the glass compositions may comprise greater than about 5 mol. % and less than or equal to about 6 mol. % alkaline earth oxide. In some particular embodiments, the alkaline earth oxide comprises SrO in a concentration greater than or equal to about 1.5 mol. % and BaO in a concentration greater than or equal to about 0 mol. % and less than or equal to about 2 mol. %. As noted hereinabove, in some embodiments, the glass compositions are substantially free from BaO.

The embodiments of the glass compositions described herein include one or more alkaline earth oxides. However, in all embodiments described herein, the glass compositions are substantially free of MgO. Accordingly, in the embodiments of the glass compositions described herein, MgO is present in the glass compositions in a concentration of less than 1 mol. %. The MgO may be introduced in the composition when magnesium-containing glass cullet, such as recycled glass cullet, is utilized to produce the glass composition.

The glass compositions described herein may optionally further comprise one or more fining agents. The fining agents may include, for example, $SnO_2$, $As_2O_3$, $Sb_2O_3$ or combinations thereof. The fining agents may be present in the glass compositions in an amount greater than or equal to about 0 mol. % and less than or equal to about 0.5 mol. %. In exemplary embodiments, the fining agent is $SnO_2$ which is present in the glass composition in an amount greater than about 0 mol. % and less than or equal to about 0.2 mol. %.

In some embodiments described herein, the glass compositions may further comprise trace amounts of $Fe_2O_3$, $ZrO_2$ and/or $TiO_2$. For example, in some embodiments, the glass compositions may comprise $Fe_2O_3$ in a concentration greater than or equal to 0 mol. % and less than or equal to 0.2 mol. %. Alternatively or additionally, the glass compositions may comprise $ZrO_2$ in a concentration greater than or equal to 0 mol. % and less than or equal to about 0.08 mol. %. Further, the glass compositions may comprise $TiO_2$ in a concentration which is greater than or equal to 0 mol. % and less than or equal to 2 mol. %.

In some embodiments described herein, the glass compositions are substantially free of heavy metals and compounds containing heavy metals. Glass compositions which are substantially free from heavy metals and compounds containing heavy metals may also be referred to as "Super-Green" glass compositions The term "heavy metals," as used herein, refers to Ba, As, Sb, Cd, and Pb.

The glass compositions described herein generally have a coefficient of thermal expansion (CTE) which is greater than or equal to about $75 \times 10^{-7}/°$ C. averaged over the range from 20° C. to 300° C. In some embodiments, the CTE of the glass compositions may be greater than or equal to about $85 \times 10^{-7}/°$ C. in a range from 20° C. to 300° C. In yet other embodiments, the CTE of the glass compositions may be greater than or equal to about $95 \times 10^{-7}/°$ C. in a range from 20° C. to 300° C. The high CTE values of the composition are attributable to, at least in part, the relatively high alkali concentration (i.e., the concentration of $K_2O$ and $Na_2O$, when present) in the glass compositions. Accordingly, in general, increasing the amount of alkali oxide in the glass composition also increases the CTE of the resultant glass. These relatively high CTEs make the glass compositions particularly well suited for use as a glass core layer in a fusion-formed laminated glass article. Specifically, when the high CTE of the glass core layer is paired with glass cladding layers having lower CTEs during the fusion lamination process, the difference in the CTEs of the glass core layer and the glass cladding layers results in the formation of a compressive stress in the glass cladding layers upon cooling. Accordingly, the glass compositions described herein may be utilized to form a strengthened laminated glass article without the need for an ion exchange treatment or thermal tempering.

The glass compositions described herein have a liquidus viscosity which renders them suitable for use in a fusion draw process and, in particular, for use as a glass core composition in a fusion laminate process. In some embodiments, the liquidus viscosity is greater than or equal to about 250 kPoise. In some other embodiments, the liquidus viscosity may be greater than or equal to 350 kPoise or even greater than or equal to 500 kPoise. The high liquidus viscosity values of the glass compositions described herein are attributable to the combination of high $SiO_2$ content in conjunction with the high concentration of tetragonal boron due to excess alkali constituents (i.e., $M_2O-Al_2O_3$) in the glass composition.

The glass compositions described herein have a low liquidus temperature which, like the liquidus viscosity, renders the glass compositions suitable for use in a fusion draw process and, in particular, for use as a glass core layer in a fusion laminate process. A low liquidus temperature prevents devitrification of the glass during the fusion draw fusion. This ensures high-quality homogeneous glass and consistent flow behavior. In some embodiments, the glass compositions have a liquidus temperature less than or equal to about 1050° C. In some other embodiments, the liquidus temperature may be less than or equal to about 1000° C. or even less than or equal to about 950° C. In some embodiments, the liquidus temperature of the glass compositions may be less than or equal to about 900° C. The liquidus temperature of the glass composition generally decreases with increasing concentrations of $B_2O_3$, alkali oxides and/or alkaline earth oxides.

Based on the foregoing, it should be understood that various embodiments of high CTE glasses are disclosed herein. In a first exemplary embodiment of a glass composition having a high CTE, the glass composition includes $SiO_2$ in a concentration greater than or equal to about 70 mol. % and less than or equal to about 80 mol. %; $Al_2O_3$ in a concentration greater than or equal to about 0 mol. % and less than or equal to about 8 mol. %; and $B_2O_3$ in a concentration greater than or equal to about 3 mol. % and less than or equal to about 10 mol. % as glass network formers. The glass composition may further include alkali oxide. The alkali oxide may include $Na_2O$ in a concentration greater than or equal to about 0 mol. % and less than or equal to about 2 mol. % and $K_2O$ in a concentration greater than or equal to about 10 mol. % and less than or equal to about 15 mol. %. The glass composition may further include alkaline earth oxide in a concentration greater than or equal to about 5 mol. % and less than or equal to about 6 mol. %. The alkaline earth oxide comprises at least one of CaO, SrO, and BaO. Moreover, the glass composition may be substantially free from MgO. The glass composition comprises a coefficient of thermal expansion which is greater than or equal to $75 \times 10^{-7}/°$ C. averaged over a temperature range from 20° C. to 300° C. and a liquidus viscosity greater than or equal to 250 kPoise.

In a second exemplary embodiment, the glass composition includes $SiO_2$ in a concentration greater than or equal to about 73 mol. % and less than or equal to about 77 mol. %; $Al_2O_3$ in a concentration greater than or equal to about 0 mol. % and less than or equal to about 3 mol. %; and $B_2O_3$ in a concentration greater than or equal to about 4 mol. % and less than or equal to about 5 mol. % as glass network formers. The glass composition may further include alkali oxide. The alkali oxide may include $Na_2O$ in a concentration greater than or equal to about 0 mol. % and less than or equal to about 2 mol. % and $K_2O$ in a concentration greater than or equal to about 11.5 mol. % and less than or equal to about 12.5 mol. %. The glass composition may further include alkaline earth oxide in a concentration greater than or equal to about 5 mol. % and less than or equal to about 6 mol. %. The alkaline earth oxide comprises at least one of CaO, SrO, and BaO. Moreover, the glass composition may be substantially free from MgO. The glass composition comprises a coefficient of thermal expansion which is greater than or equal to $75 \times 10^{-7}/°$ C. averaged over a temperature range from 20° C. to 300° C. and a liquidus viscosity greater than or equal to 250 kPoise.

In a third exemplary embodiment, the glass compositions includes $SiO_2$ in a concentration greater than or equal to about 70 mol. % and less than or equal to about 80 mol. %; $Al_2O_3$ in a concentration greater than or equal to about 0 mol. % and less than or equal to about 8 mol. %; and $B_2O_3$ in a concentration greater than or equal to about 3 mol. % and less than or equal to about 10 mol. % as glass network formers. The glass composition may further include alkali oxide. The alkali oxide may include $Na_2O$ in a concentration greater than or equal to about 0 mol. % and less than or equal to about 2 mol. % and $K_2O$ in a concentration greater than or equal to about 10 mol. % and less than or equal to about 15 mol. %. The glass composition may further include alkaline earth oxide in a concentration greater than or equal to about 5 mol. % and less than or equal to about 6 mol. %. The alkaline earth oxide comprises SrO in a concentration greater than or equal to about 1.5 mol. % and BaO in a concentration from about 0 mol. % to about 2 mol. %. Moreover, the glass composition may be substantially free from MgO. The glass composition comprises a coefficient of thermal expansion which is greater than or equal to $75 \times 10^{-7}/°$ C. averaged over a temperature range from 20° C. to 300° C. and a liquidus viscosity greater than or equal to 250 kPoise.

In a fourth exemplary embodiment, the glass composition includes $SiO_2$ in a concentration greater than or equal to about 70 mol. % and less than or equal to about 80 mol. %; $Al_2O_3$ in a concentration greater than or equal to about 0 mol. % and less than or equal to about 8 mol. %; and $B_2O_3$ in a concentration greater than or equal to about 3 mol. % and less than or equal to about 10 mol. % as glass network formers. The glass composition may further include alkali oxide. The alkali oxide may include $Na_2O$ in a concentration greater than or equal to about 0.1 mol. % and less than or equal to about 2 mol. % and $K_2O$ in a concentration greater than or equal to about 10 mol. % and less than or equal to about 15 mol. %. The glass composition may further include alkaline earth oxide in a concentration greater than or equal to about 5 mol. % and less than or equal to about 6 mol. %. The alkaline earth oxide comprises at least one of CaO, SrO, and BaO. Moreover, the glass composition may be substantially free from MgO. The glass composition comprises a coefficient of thermal expansion which is greater than or equal to $75 \times 10^{-7}/°$ C. averaged over a temperature range from 20° C. to 300° C. and a liquidus viscosity greater than or equal to 250 kPoise.

In a fifth exemplary embodiment, the glass composition includes $SiO_2$ in a concentration greater than or equal to about 70 mol. % and less than or equal to about 80 mol. %; $Al_2O_3$ in a concentration greater than or equal to about 0 mol. % and less than or equal to about 8 mol. %; and $B_2O_3$ in a concentration greater than or equal to about 3 mol. % and less than or equal to about 10 mol. % as glass network formers. The glass composition may further include alkali oxide. The alkali oxide may include $Na_2O$ in a concentration greater than or equal to about 0 mol. % and less than or equal to about 2 mol. % and $K_2O$ in a concentration greater than or equal to about 10 mol. % and less than or equal to about 15 mol. %. In this embodiment, the concentration of $K_2O$ is greater than the sum of the concentration of $B_2O_3$ and the concentration of $Al_2O_3$. The glass composition may further include alkaline earth oxide in a concentration greater than or equal to about 5 mol. % and less than or equal to about 6 mol. %. The alkaline earth oxide comprises at least one of CaO, SrO, and BaO. The glass composition comprises a coefficient of thermal expansion which is greater than or equal to $75 \times 10^{-7}/°$ C. averaged over a temperature range from 20° C. to 300° C. and a liquidus viscosity greater than or equal to 250 kPoise.

While exemplary glass compositions have been described hereinabove with reference to specific compositional ranges for various constituent components (such as $SiO_2$, $Al_2O_3$, $B_2O_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

Referring now to FIG. 1, the glass compositions described herein may be used to form a glass article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass core layer due to their relatively high coefficients of thermal expansion, as will be discussed in more detail herein.

FIG. 1 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass core layer 102 is formed from a first glass composition having an average core coefficient of thermal expansion $CTE_{core}$ and the glass cladding layers 104a, 104b are formed from a second, different glass composition which has an average cladding coefficient of thermal expansion $CTE_{clad}$. The $CTE_{core}$ is greater than $CTE_{clad}$ which results in the glass cladding layers 104a, 104b being compressively stressed without being ion exchanged or thermally tempered.

Figure 2:
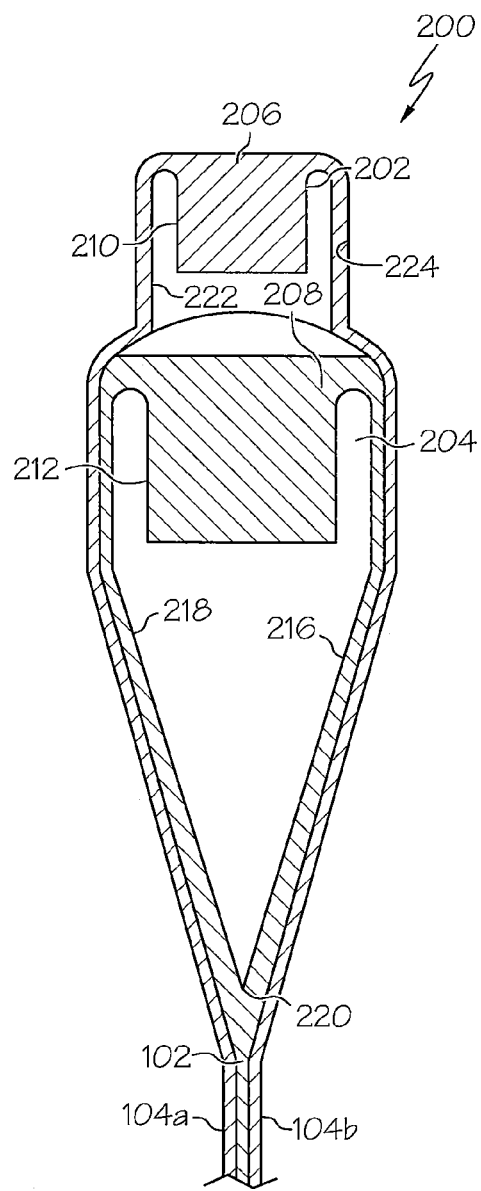
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$ which is greater than the average cladding coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or thermal tempering treatment.

Referring again to the laminated glass article 100 depicted in FIG. 1, the glass core layer 102 of the laminated glass article is formed from a glass composition with a relatively high average coefficient of thermal expansion, such as the glass compositions described herein which have coefficients of thermal expansion greater than or equal to $75 \times 10^{-7}/°$ C.

For example, in one embodiment, the glass core layer is formed from a glass composition having a high CTE, such as the glass compositions described hereinabove which comprise from about 70 mol. % to about 80 mol. % $SiO_2$; from about 0 mol. % to about 8 mol. % $Al_2O_3$; and from about 3 mol. % to about 10 mol. % $B_2O_3$ as glass network formers. The glass composition may also comprise from about 0 mol. % to about 2 mol. % $Na_2O$; and from about 10 mol. % to about 15 mol. % $K_2O$. In some embodiments, the glass composition may further comprise from about 5 mol. % to about 6 mol. % of alkaline earth oxide. The alkaline earth oxide in the compositions comprises at least one of CaO, SrO, and BaO. However, the glass composition may be substantially free from MgO.

In another embodiment, the glass core layer may be formed from a glass composition with a high CTE which includes from about 73 mol. % to about 77 mol. % $SiO_2$; from about 0 mol. % to about 3 mol. % $Al_2O_3$; and from about 4 mol. % to about 5 mol. % $B_2O_3$ as glass network formers. The glass composition may further include from about 0 mol. % to about 2 mol. % $Na_2O$ and from about 11.5 mol. % to about 12.5 mol. % $K_2O$.

While specific glass compositions for use as the glass core layer 102 have been described herein, it should be understood that any of the glass compositions described herein may be used to form the glass core layer 102 of the laminated glass article 100.

While the glass core layer 102 of the glass laminate structure has been described hereinabove as being formed from a glass composition having a relatively high average coefficient of thermal expansion, the glass cladding layers 104a, 104b of the glass article 100 are formed from glass compositions which have a lower average coefficient of thermal expansion to facilitate the development of compressive stress in the cladding layers upon cooling of the laminated glass article following fusion formation. For example, the glass cladding layers may be formed from a glass composition such as a composition described in co-pending U.S. patent application Ser. No. 61/604,839 entitled "Low CTE Alkali-Free BoroAluminosilcate Glass Compositions and Glass Articles Comprising the Same" [Attorney Docket No. SP12-049P] assigned to Corning Incorporated, which have coefficients of thermal expansion less than or equal to $40 \times 10^{-7}/°$ C. in a temperature range from 20° C. to 300° C. For example, the glass cladding layers may be formed from a glass composition which comprises: from about 60 mol. % to about 66 mol. % $SiO_2$; from about 7 mol. % to about 10 mol. % $Al_2O_3$; from about 14 mol. % to about 18 mol. % $B_2O_3$; and from about 9 mol. % to about 16 mol. % alkaline earth oxide, wherein the alkaline earth oxide comprises at least CaO and the CaO is present in the glass composition in a concentration from about 3 mol. % to about 12 mol % and the glass composition is substantially free from alkali metals and compounds containing alkali metals. However, it should be understood that other glass compositions may also be used to form the glass cladding layers 104a, 104b of the laminated glass article 100, so long as the coefficients of thermal expansion of the glass cladding layers 104a, 104b are less than the average coefficient of thermal expansion of the glass core layer 102.

EXAMPLES

The embodiments of the glass compositions described herein will be further clarified by the following examples.

A plurality of exemplary glass compositions were prepared according to the batch compositions listed in Tables 1-3 below. Batches of the oxide constituent components were mixed, melted and formed into glass plates. The properties of the glass melt (i.e., liquidus temperature, annealing point, etc.) and the resultant glass article were measured and the results are reported in Tables 1-3.

Referring to Tables 1-3, the composition and properties of inventive glass compositions (i.e., Examples A1-A12) and comparative glass compositions (i.e., Examples C1-C13) are provided. As indicated in the Tables, Examples A1-A12 each exhibited a relatively high liquidus viscosity (greater than about 250 kPoise), and a relatively high coefficient of thermal expansion (greater than or equal to about $75 \times 10^{-7}/°$ C.) which makes the glass compositions well suited for use with fusion forming processes and, in particular, for use as glass core layers in fusion-formed laminated glass articles.

Comparative Examples C1-C13 were formed from non-inventive compositions and are presented herein solely for purposes of comparison. Comparative Examples C1 and C2 were utilized to explore low liquidus regions in the potassium-barium-silicate ternary space. Comparative Examples C4-C6, C9, and C11 contained high concentrations of $K_2O$ which decreased the liquidus viscosity of the compositions to less than 250 kPoise. Comparative Examples C7 and C8 included high concentrations of $B_2O_3$ which also had the effect of decreasing the liquidus viscosity of the composition to less than 250 kPoise. Comparative Example C10 included high concentrations of $Na_2O$ which also had the effect of decreasing the liquidus viscosity of the composition. Comparative Examples 12 and 13 each had relatively low concentrations of $SiO_2$ and high concentrations of $K_2O$, which, in conjunction with one another, significantly depressed the liquidus viscosity of the glass composition.

TABLE 1

Exemplary Glass Compositions

| Batched (mol %) | C1 | C2 | A1 | A2 | A3 | C3 | C4 | C5 | C6 | A4 |
|---|---|---|---|---|---|---|---|---|---|---|
| $SiO_2$ | 79.38 | 74.11 | 76.11 | 76.11 | 76.11 | 75.11 | 72.11 | 72.11 | 72.11 | 71.11 |
| $T_iO_2$ | 0 | 0 | 0 | 0 | 0 | 1 | 0 | 0 | 0 | 0 |
| $Al_2O_3$ | 0 | 0 | 0 | 0 | 0 | 0 | 0 | 0 | 0 | 0 |
| $B_2O_3$ | 0 | 5.27 | 5.27 | 5.27 | 5.27 | 5.27 | 7.27 | 7.27 | 7.27 | 9.27 |

TABLE 1-continued

Exemplary Glass Compositions

| Batched (mol %) | C1 | C2 | A1 | A2 | A3 | C3 | C4 | C5 | C6 | A4 |
|---|---|---|---|---|---|---|---|---|---|---|
| $Na_2O$ | 0 | 0 | 0 | 0 | 1 | 0 | 0 | 0 | 0 | 0 |
| $K_2O$ | 15.25 | 15.25 | 13.25 | 13.25 | 12.25 | 13.25 | 15.25 | 15.25 | 15.25 | 14.25 |
| CaO | 0 | 0 | 0 | 0 | 0 | 0 | 0 | 0 | 0 | 0 |
| SrO | 0 | 0 | 0 | 2.63 | 0 | 0 | 0 | 2.63 | 5.27 | 2.63 |
| BaO | 5.27 | 5.27 | 5.27 | 2.64 | 5.27 | 5.27 | 5.27 | 2.64 | 0 | 2.64 |
| $SnO_2$ | 0.1 | 0.1 | 0.1 | 0.1 | 0.1 | 0.1 | 0.1 | 0.1 | 0.1 | 0.1 |
| Total | 100 | 100 | 100 | 100 | 100 | 100 | 100 | 100 | 100 | 100 |
| Anneal Pt (C.): | 494 | 563 | 585 | 599 | 572 | 591 | 583 | 593 | 607 | 609 |
| Strain Pt (C.): | 449 | 515 | 536 | 551 | 522 | 542 | 538 | 548 | 563 | 566 |
| Soft Pt (C.): | 694.1 | 749.3 | 773.7 | 782.2 | 762.2 | 774 | 756.5 | 762.2 | 776 | 772.5 |
| Log [Eta_inf (Pa-s)]: | −2.3 | −1.8 | −1.8 | −1.8 | −1.8 | −1.8 | −1.4 | −1.5 | −1.5 | −1.4 |
| Tg (C.): | 487.7 | 575.1 | 593.1 | 599.7 | 581.1 | 600.4 | 604.8 | 608.2 | 620.0 | 628.1 |
| Fragility: | 29.1 | 38.2 | 38.6 | 37.5 | 37.3 | 39.0 | 41.7 | 42.5 | 43.0 | 45.9 |
| Density (g/cm^3): | 2.578 | 2.622 | 2.615 | 2.574 | 2.61 | 2.626 | 2.638 | 2.597 | 2.553 | 2.605 |
| CTE (×10^−7/C.): | 103 | 93.6 | 86.7 | 83.7 | 84.8 | 85.2 | 91.1 | 91.1 | 89.1 | 85.6 |
| Liquidus Temp (C.): | 835 | 895 | 885 | 890 | 880 | 1040 | 970 | 980 | 970 | 990 |
| Primary Devit Phase: | Cristo-balite | Cristo-balite | Cristo-balite | Cristo-balite | Cristo-balite | Rutile | Quartz | Quartz | Quartz | Quartz |
| Liquidus Visc (Poise): | 6.34E+05 | 2.39E+05 | 5.75E+05 | 8.78E+05 | 5.98E+05 | 1.56E+04 | 4.91E+04 | 3.17E+04 | 5.47E+04 | 2.35E+04 |
| Poisson's Ratio: | 0.224 | 0.223 | 0.221 | 0.223 | 0.222 | 0.212 | | | | |
| Shear Modulus (Mpsi): | 3.305 | 3.674 | 3.836 | 3.941 | 3.948 | 3.878 | | | | |
| Young's Modulus (Mpsi): | 8.094 | 8.986 | 9.369 | 9.638 | 9.649 | 9.4 | | | | |
| Refractive Index | 1.51006 | 1.518255 | 1.519175 | 1.514445 | 1.518175 | 1.52227 | | | | |

TABLE 2

Exemplary Glass Compositions

| Batched (mol %) | C7 | C8 | A5 | A6 | A7 | A8 | C9 | A10 |
|---|---|---|---|---|---|---|---|---|
| $SiO_2$ | 70.11 | 71.11 | 74.11 | 72.11 | 70.11 | 72.11 | 72.11 | 72.11 |
| $T_iO_2$ | 0 | 0 | 0 | 0 | 0 | 0 | 0 | 0 |
| $Al_2O_3$ | 0 | 0 | 2 | 4 | 6 | 2 | 2 | 4 |
| $B_2O_3$ | 11.27 | 11.27 | 5.27 | 5.27 | 5.27 | 7.27 | 5.27 | 5.27 |
| $Na_2O$ | 0 | 0 | 0 | 0 | 0 | 0 | 0 | 0 |
| $K_2O$ | 13.25 | 12.25 | 13.25 | 13.25 | 13.25 | 13.25 | 15.25 | 13.25 |
| CaO | 0 | 0 | 0 | 0 | 0 | 0 | 0 | 1.75 |
| SrO | 2.63 | 5.27 | 2.63 | 2.63 | 2.63 | 2.63 | 2.63 | 1.76 |
| BaO | 2.64 | 0 | 2.64 | 2.64 | 2.64 | 2.64 | 2.64 | 1.76 |
| $SnO_2$ | 0.1 | 0.1 | 0.1 | 0.1 | 0.1 | 0.1 | 0.1 | 0.1 |
| Total | 100 | 100 | 100 | 100 | 100 | 100 | 100 | 100 |
| Anneal Pt (C.): | 623 | 633 | 616 | 625 | 631 | 626 | 599 | 633 |
| Strain Pt (C.): | 582 | 592 | 569 | 579 | 586 | 581 | 554 | 587 |
| Soft Pt (C.): | 781.9 | 793.1 | 300 | 813 | 826 | 803 | 774 | 823 |
| Log[Eta_inf (Pa-s)]: | −1.4 | −1.4 | −1.6 | −1.6 | −1.9 | −1.2 | −1.6 | −1.6 |

TABLE 2-continued

Exemplary Glass Compositions

| Batched (mol %) | C7 | C8 | A5 | A6 | A7 | A8 | C9 | A10 |
|---|---|---|---|---|---|---|---|---|
| Tg (C.): | 638.8 | 644.7 | 616.0 | 608.0 | 601.0 | 635.3 | 594.3 | 624.0 |
| Fragility: | 46.7 | 46.0 | 38.5 | 36.5 | 33.0 | 42.1 | 38.1 | 36.7 |
| Density (g/cm$^3$): | 2.61 | 2.556 | 2.569 | 2.565 | 2.563 | 2.577 | 2.581 | 2.526 |
| CTE (x10$^{-7}$/C.): | 79.7 | 77.4 | 82.7 | 82.6 | 82.4 | 80.3 | 89.8 | 80.9 |
| Liquidus Temp (C.): | 1000 | 1000 | 880 | 920 | 985 | 920 | 920 | 895 |
| Primary Devit Phase: | Quartz | Quartz | Quartz | Quartz | Quartz | Quartz | Quartz | Quartz |
| Liquidus Visc (Poise): | 2.22E+04 | 3.14E+04 | 1.99E+06 | 7.34E+05 | 2.75E+05 | 5.67E+05 | 2.75E+05 | 2.81E+06 |
| Poisson's Ratio: | | | | | | | | |
| Shear Modulus (Mpsi): | | | | | | | | |
| Young's Modulus (Mpsi): | | | | | | | | |
| Refractive Index | | | | | | | | |

TABLE 3

Exemplary Glass Compositions

| Batched (mol %) | A11 | A12 | C10 | C11 | C12 | C13 |
|---|---|---|---|---|---|---|
| $S_iO_2$ | 74.11 | 74.11 | 74.11 | 70.11 | 66.11 | 62.11 |
| $Al_2O_3$ | 2 | 2 | 2 | 3 | 4 | 5 |
| $B_2O_3$ | 5.26 | 5.26 | 5.26 | 6.26 | 7.26 | 8.26 |
| $Na_2O$ | 0 | 0 | 13.25 | 0 | 0 | 0 |
| K2O | 13.25 | 13.25 | 0 | 15.25 | 17.25 | 19.25 |
| CaO | 2.64 | 0 | 2.64 | 2.64 | 2.64 | 2.64 |
| SrO | 2.64 | 5.28 | 2.64 | 2.64 | 2.64 | 2.64 |
| $SnO_2$ | 0.1 | 0.1 | 0.1 | 0.1 | 0.1 | 0.1 |
| Total | 100 | 100 | 100 | 100 | 100 | 100 |
| AMPL Anneal (C.): | 625 | 625 | 625 | 625 | 625 | 625 |
| Anneal Pt (C.): | 627 | 625 | 563 | 621 | 608 | 591 |
| Strain Pt (C.): | 583 | 580 | 524 | 580 | 567 | 552 |
| Soft Pt (C.): | 811.5 | 809.3 | 727.8 | 797.7 | 784 | 762.5 |
| Log[Eta_inf (Pa-s)]: | −1.6 | −1.6 | −1.1 | −1.1 | −0.9 | −1.2 |
| Tg (C.): | 621.0 | 617.0 | 569.5 | 625.1 | 620.0 | 597.1 |
| Fragility: | 38.7 | 38.6 | 40.9 | 43.0 | 44.4 | 42.3 |
| Density (g/cm$^3$): | 2.494 | 2.532 | 2.512 | 2.506 | 2.515 | 2.522 |
| CTE (×10$^{-7}$/C.): | 82.7 | 82.9 | 76.7 | 88.5 | 93.9 | 98 |
| Liquidus Temp (C.): | 930 | 900 | 990 | 955 | 970 | 1010 |
| Primary Devit Phase: | Quartz | Quartz | Tridymite | Quartz | Quartz | Quartz |
| Liquidus Visc (kPoise): | 500.42 | 1053.98 | 15.65 | 119.82 | 56.08 | 16.03 |
| Poisson's Ratio: | 0.21 | 0.215 | 0.214 | 0.224 | 0.223 | 0.234 |
| Shear Modulus (Mpsi): | 4.067 | 4.01 | 4.563 | 4.016 | 3.932 | 3.845 |
| Young's Modulus (Mpsi): | 9.845 | 9.746 | 11.082 | 9.835 | 9.618 | 9.489 |
| Refractive Index | | | | | | |

It should now be understood that the glass compositions described herein have a relatively high average coefficient of thermal expansion. As such, the glass compositions described herein are particularly well suited for use in conjunction with glass compositions having relatively lower coefficients of thermal expansion to form compressively stressed laminated glass articles by the fusion laminate process. These glass articles may be employed in a variety of consumer electronic devices including, without limitation, mobile telephones, personal music players, tablet computers, LCD and LED displays, automated teller machines and the like.

It should also be understood that the properties of the glass compositions described herein (e.g., the liquidus viscosity, the liquidus temperature, and the like) make the glass compositions well suited for use with fusion forming processes, such as the fusion down draw process or the fusion lamination process.

Moreover, the mobility of alkali ions in the glass compositions is significantly reduced due to the low concentration of $Al_2O_3$ as well as the higher concentration of $B_2O_3$ in the glass compositions. Accordingly, the glass compositions described herein may be particularly well suited for use as backplane substrates of LCD, LED and OLED displays where the presence of highly mobile alkali ions in the backplane substrate may damage the thin film transistors on the substrate. The glass compositions described herein may be used to form the entire backplane substrate or, alternatively, may be used as a glass core layer enveloped by alkali-free glass cladding layers in a laminated glass substrate.

Further, while specific reference has been made herein to the use of the glass compositions as glass core layers in a laminated glass article, it should be understood that the glass compositions may also be used independently (i.e., not as part of a laminated structure) to form glass articles such as cover glasses for electronic devices and other, similar glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 70 mol. % to about 80 mol. % $SiO_2$;
   from 0 mol. % to about 8 mol. % $Al_2O_3$;
   from about 3 mol. % to about 10 mol. % $B_2O_3$;
   from 0 mol. % to about 2 mol. % $Na_2O$;
   from about 10 mol. % to about 15 mol. % $K_2O$; and
   from 5 mol. % to 6 mol. % of SrO+BaO
   the glass composition comprises a coefficient of thermal expansion greater than or equal to $75 \times 10^{-7}$/° C. averaged over a temperature range from 20° C. to 300° C.;
   the glass composition comprises a liquidus viscosity greater than or equal to 250 kPoise; and
   the glass composition is substantially free from MgO and CaO.

2. The glass composition of claim 1, wherein the glass composition comprises:
   from about 73 mol. % to about 77 mol. % $SiO_2$;
   from 0 mol. % to about 3 mol. % $Al_2O_3$;
   from about 4 mol. % to about 5 mol. % $B_2O_3$; and
   from about 11.5 mol. % to about 12.5 mol. % $K_2O$.

3. The glass composition of claim 1, wherein the glass comprises:
   greater than or equal to about 1.5 mol. % SrO; and
   from 0 mol. % to about 2 mol. % BaO.

4. The glass composition of claim 1, wherein a concentration of $Na_2O$ is greater than or equal to about 0.1 mol. %.

5. The glass composition of claim 1, wherein a concentration of $K_2O$ (mol. %) is greater than a sum of a concentration of $B_2O_3$ (mol. %) and a concentration of $Al_2O_3$ (mol. %).

6. The glass composition of claim 1, wherein the glass composition is substantially free of BaO.

7. The glass composition of claim 1, wherein the glass composition further comprises at least one of $SnO_2$, $As_2O_3$, and $Sb_2O_3$ as a fining agent.

8. The glass composition of claim 1, wherein the glass composition is substantially free from heavy metals.

9. The glass composition of claim 1, wherein the glass composition is free from MgO.

10. The glass composition of claim 1, wherein the glass composition is free from CaO.

11. A glass article comprising:
    a glass core layer disposed between a first glass cladding layer and a second glass cladding layer, wherein the glass core layer is formed from the glass composition of claim 1.

12. The glass article of claim 11, wherein the glass comprises:
    greater than or equal to about 1.5 mol. % SrO; and
    from 0 mol. % to about 2 mol. % BaO.

13. The glass article of claim 11, wherein the glass core layer comprises:
    from about 73 mol. % to about 77 mol. % $SiO_2$;
    from 0 mol. % to about 3 mol. % $Al_2O_3$;
    from about 4 mol. % to about 5 mol. % $B_2O_3$;
    from 0 mol. % to about 2 mol. % $Na_2O$; and
    from about 11.5 mol. % to about 12.5 mol. % $K_2O$.

14. The glass article of claim 11, wherein $Na_2O$ is present in the glass core layer in a concentration greater than or equal to about 0.1 mol. %.

15. The glass article of claim 11, wherein a concentration of $K_2O$ (mol. %) in the glass core layer is greater than a sum of a concentration of $B_2O_3$ (mol. %) in the glass core layer and a concentration of $Al_2O_3$ (mol. %) in the glass core layer.

16. The glass article of claim 11, wherein the glass core layer is substantially free of BaO.

17. The glass article of claim 11, wherein the glass core layer further comprises at least one of $SnO_2$, $As_2O_3$, and $Sb_2O_3$ as a fining agent.

18. The glass article of claim 11, wherein:
    the glass core layer has an average core coefficient of thermal expansion $CTE_{core}$; and
    the first glass cladding layer and the second glass cladding layer have an average cladding coefficient of thermal expansion $CTE_{clad}$ which is less than the average core coefficient of thermal expansion $CTE_{core}$.

19. The glass article of claim 11, wherein the glass core layer is substantially free from heavy metals.

20. The glass article of claim 11, wherein a first surface of the glass core layer is directly adjacent the first glass cladding layer, and wherein a second surface of the glass core layer is directly adjacent the second glass cladding layer.

21. The glass article of claim 11, wherein a diffusive layer is disposed between at least one of the first glass cladding layer or the second glass cladding layer and the glass core layer, and the average coefficient of thermal expansion of the diffusive layer has a value between that of an average core coefficient of thermal expansion of the glass core layer and an average cladding coefficient of thermal expansion of the at least one of the first glass cladding layer or the second glass cladding layer.

22. An electronic device comprising the glass article of claim 11.

23. An architectural pane comprising the glass article of claim 11.

24. A vehicle comprising the glass article of claim 11.

25. An appliance comprising the glass article of claim 11.

* * * * *